United States Patent
Brittingham

(12) 
(10) Patent No.: US 6,805,534 B1
(45) Date of Patent: Oct. 19, 2004

(54) CURVED BUCKET AFT SHANK WALLS FOR STRESS REDUCTION

(75) Inventor: Robert Alan Brittingham, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 10/420,868

(22) Filed: Apr. 23, 2003

(51) Int. Cl.[7] .................................................. F01D 5/08
(52) U.S. Cl. .................... 416/97 R; 416/115; 416/116; 416/96 R
(58) Field of Search ................ 416/97 R, 96 R, 416/151, 116; 415/115, 175, 176–178

(56) References Cited

U.S. PATENT DOCUMENTS

| 5,160,242 | A | * | 11/1992 | Brown | 416/193 A |
|---|---|---|---|---|---|
| 5,267,834 | A | * | 12/1993 | Dinh et al. | 416/223 A |
| 6,099,253 | A | * | 8/2000 | Fukue et al. | 416/97 R |
| 6,190,131 | B1 | | 2/2001 | Deallenbach | |
| 6,428,279 | B1 | | 8/2002 | Reluzco et al. | |
| 6,431,833 | B2 | | 8/2002 | Jones | |
| 6,478,540 | B2 | | 11/2002 | Abuaf et al. | |
| 6,499,950 | B2 | * | 12/2002 | Willett et al. | 416/97 R |
| 6,506,022 | B2 | * | 1/2003 | Bunker | 416/97 R |

* cited by examiner

*Primary Examiner*—Edward K. Look
*Assistant Examiner*—J. M. McAleenan
(74) *Attorney, Agent, or Firm*—Nixon & Vanderhye P.C.

(57) ABSTRACT

A turbine bucket comprising an airfoil portion and a shank portion with a substantially horizontal platform radially therebetween, the shank portion having a forward shank wall and an aft shank wall; at least the aft shank wall convexly curved from one side of the bucket to an opposite side of the bucket.

12 Claims, 4 Drawing Sheets

CURVED BUCKET AFT SHANK WALLS FOR STRESS REDUCTION

BACKGROUND OF THE INVENTION

This invention relates generally to turbine blades and, specifically, to a design modification in a turbine blade aft shank wall for stress reduction.

When a bucket in a power systems turbine or a blade in an aircraft engine requires a hollow core for cooling air, the proximity of the core cooling cavities to the forward and rear shank walls (coverplates) can be problematic. For example, the cooling cavity closest to the aft shank wall may create a barely sufficient, thin metal ligament between the aft wall and the cooling cavity, causing a high stress location and potentially low part life. Additionally, this situation may preclude the shank wall from undercutting the airfoil trailing edge, a desired condition for airfoil root trailing edge stress relief. In other words, the desire to have the trailing edge overhang the aft shank wall often competes with the requirement to maintain adequate wall thickness between the core cavity and the aft shank wall.

Reduction of stress, particularly in the airfoil root trailing edge, requires both thermal management of the part to reduce thermal stress, and a geometry designed to relieve the loading of the airfoil trailing edge.

In a related matter, sealing of the turbine bucket or blade is crucial, as parasitic leaks degrade engine performance. Seal pins are typically used to reduce leaks between adjacent buckets. It is therefore also imperative that the ends of adjacent shanks join relatively closely from the concave sides to the convex sides of the buckets.

BRIEF DESCRIPTION OF THE INVENTION

This invention relieves stress at the root trailing edge of a rotating turbine airfoil while maintaining adequate wall thickness between core cavities and the aft shank wall. The invention also maintains mating side surfaces for sealing and leak reduction. More specifically, the invention utilizes a convexly curved aft shank wall that provides additional material between the aft shank wall and the nearest cooling cavity, and that also enables increased overhang of the trailing edge of the airfoil. The aft wall is curved from one side of the bucket to the other, so as to allow adjacent edges to align and thus facilitate sealing between adjacent buckets.

It will be appreciated that for some bucket applications, it may be desirable to provide a convexly curved surface on the forward shank wall as well.

In one aspect, therefore, the invention relates to a turbine bucket comprising an airfoil portion and a shank portion with a substantially horizontal platform radially therebetween, the shank portion having a forward shank wall and an aft shank wall; at least the aft shank wall convexly curved from one side of the bucket to an opposite side of the bucket.

In another aspect, the invention relates to a turbine bucket comprising an airfoil portion and a shank portion with a substantially horizontal platform radially therebetween, the shank portion having a forward shank wall and an aft shank wall; the aft shank wall convexly curved from one side of the bucket to an opposite side of the bucket; wherein the internal cooling circuit includes a plurality of cavities in the shank portion and the airfoil portion and wherein one of the cavities lies adjacent the aft shank wall; and further wherein the airfoil portion includes a leading edge and a trailing edge, the trailing edge overhanging the aft shank wall.

The invention will now be described in detail in connection with the drawings identified below.

DETAILED DESCRIPTION OF THE INVENTION

Figure 1:
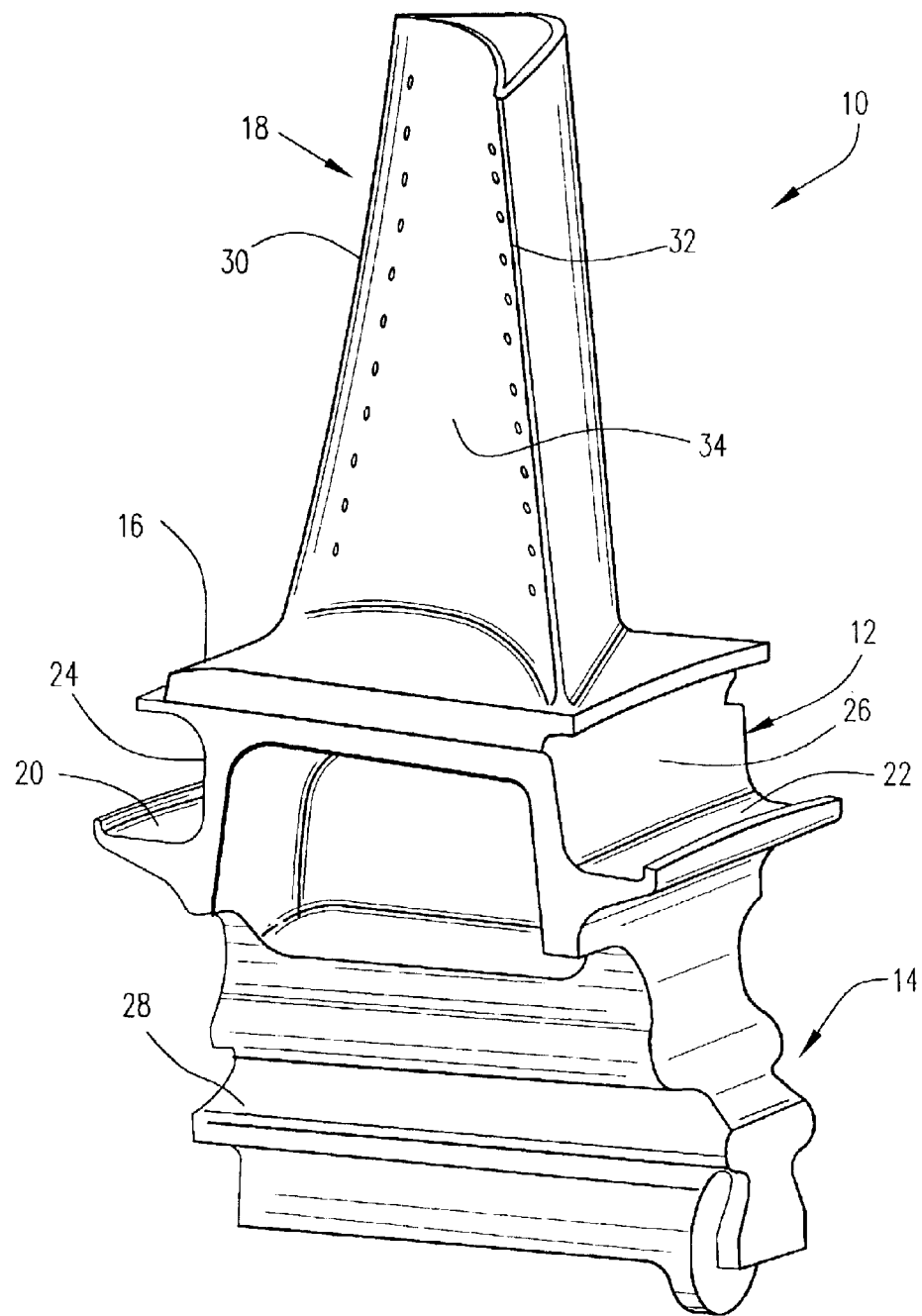
FIG. 1 is a perspective view of a conventional turbine bucket.

FIG. 1 illustrates a conventional turbine bucket 10 that includes generally a shank portion 12, an attachment portion 14, a platform portion 16 and an airfoil portion (or simply, "airfoil" 18). In terms of a bucket as mounted on a turbine rotor wheel, the platform portion 16 is radially between the shank portion 12 and the airfoil portion 18, with the airfoil portion 18 joined to the upper or radially outer surface of the platform. So called "angel wings" or sealing flanges 20, 22 project axially away from the forward and aft walls 24, 26, respectively, of the shank portion 12. The attachment portion 14 is shown to be of the generally "axial entry" type and includes a "firtree" 28, (the attachment portion could also be in the form of a dovetail or other surface locking configuration) designed to mate with a complementary-shaped groove (not shown) on the periphery of the turbine rotor wheel. It will be understood that the invention described herein is not limited by the configuration of the attachment portion 14. The airfoil portion 18 has a leading edge 30 and a trailing edge 32, with a concave surface 34 on the pressure side of the airfoil portion.

Figure 2:
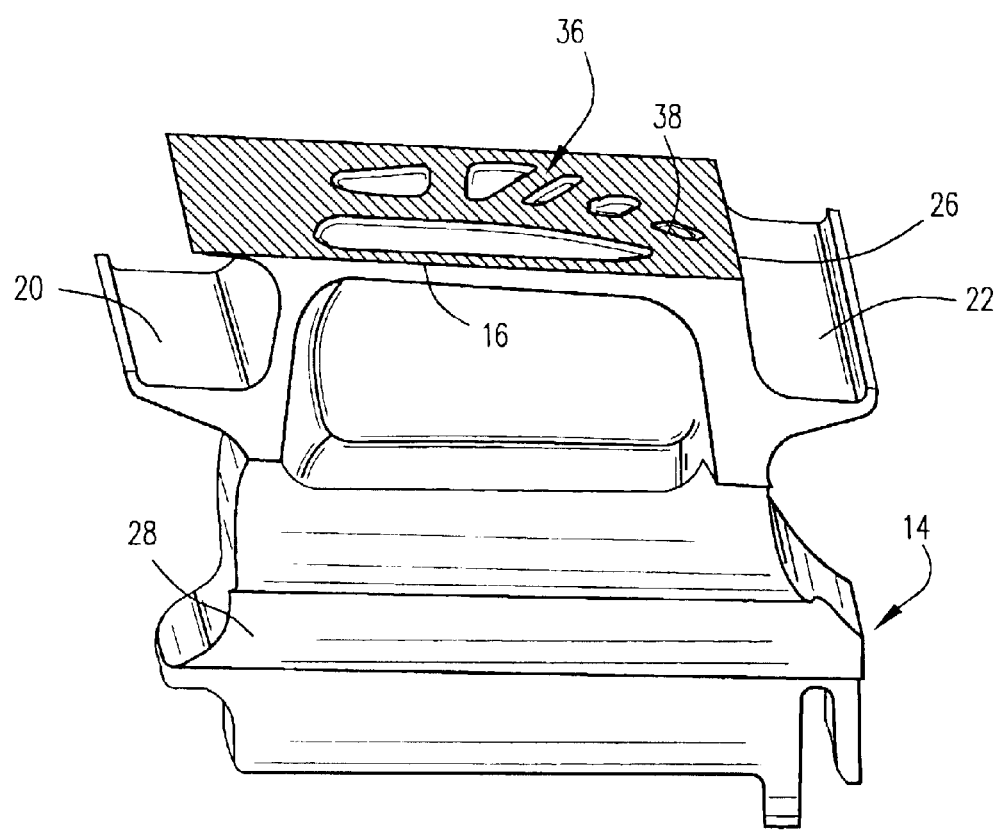
FIG. 2 is an enlarged partial perspective of the bucket shown in FIG. 1, sectioned at a location of minimum wall thickness between an aft core cavity and the aft shank wall of the bucket.
Figure 3:
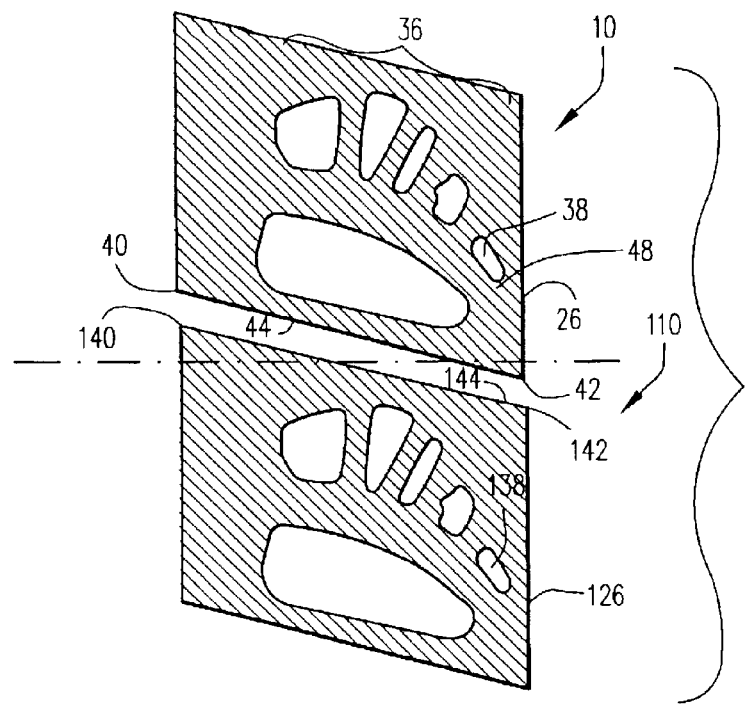
FIG. 3 is a simplified partial section, in plan, of a pair of conventional buckets shown in side-by-side relationship as installed on a turbine wheel.

As best seen in FIG. 2, the bucket 10 is formed with an internal cooling circuit that includes cooling passages or cavities 36 in the shank portion 12 that communicate with larger inlet and outlet manifolds (not shown) in the shank portion attachment 14 and that extend upwardly into the airfoil portion 18. Of particular concern here is the cavity 38 that is located adjacent the aft wall 26. FIGS. 2 and 3 illustrate the close proximity of the cavity 38 to the aft shank wall 26 with a relatively thin ligament 48 therebetween. FIG. 3 also illustrates the manner in which adjacent buckets 10 and 110 are closely aligned when mounted on a turbine wheel, with respective corner edges 40, 42 of bucket 10 closely aligned with corner edges 140, 142 of bucket 110. The space between side surfaces 44 and 144 may be on the order of about 0.040 inch, and as mentioned above, seal pins (not shown) are typically located within this space to prevent leakage between the adjacent buckets. Specifically, there are two seal pins, one oriented horizontally as mentioned above, and the other oriented radially, mating between radial surfaces adjacent to edges 42 and 142 of FIG. 3.

Figure 4:
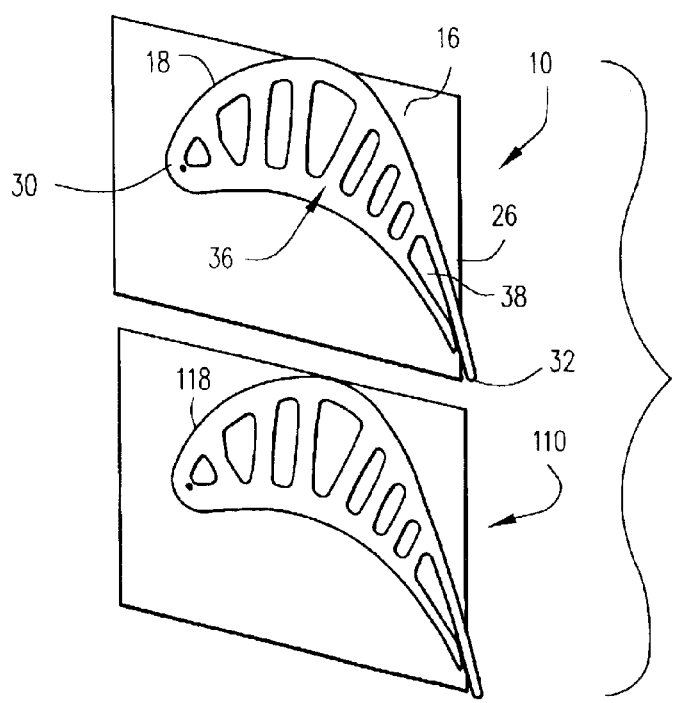
FIG. 4 is a view similar to FIG. 3, but sectioned through the airfoil portions of the buckets.

FIG. 4 is similar to FIG. 3 but also shows the airfoil portions 18, 118 of the respective buckets 10, 110. Of note in this Figure is the extent of overhang of the trailing edge 32 relative to the aft shank wall 26. It will be appreciated that simply extending the aft wall to increase the width of ligament 48 between cavity 38 and the aft shank wall 26 would impair the ability to have an acceptable overhang.

Figure 5:
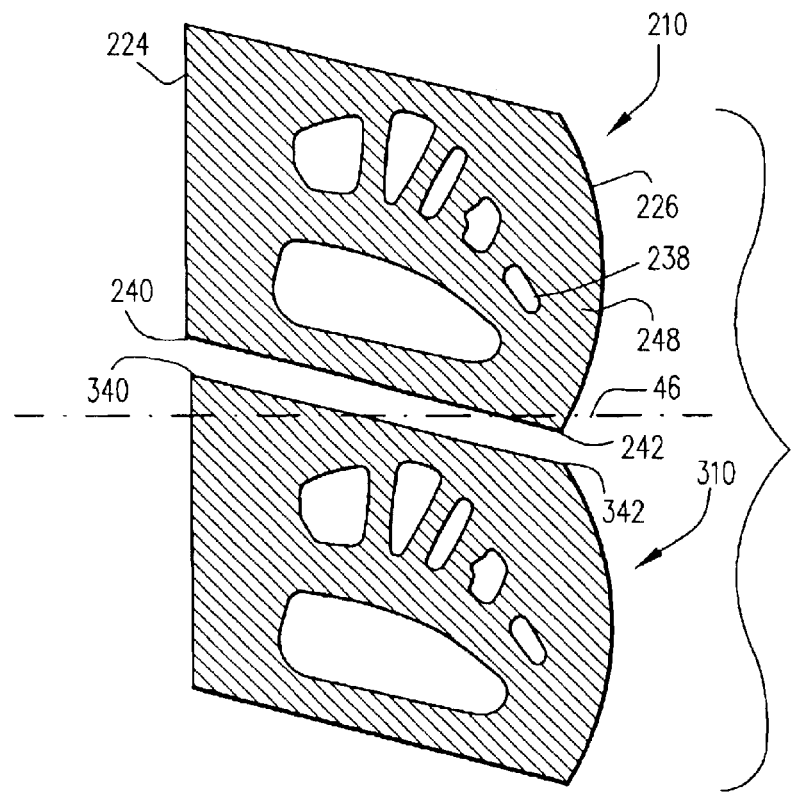
FIG. 5 is a partial section in plan of two adjacent buckets, with curved aft shank walls in accordance with an exemplary embodiment of this invention.
Figure 6:
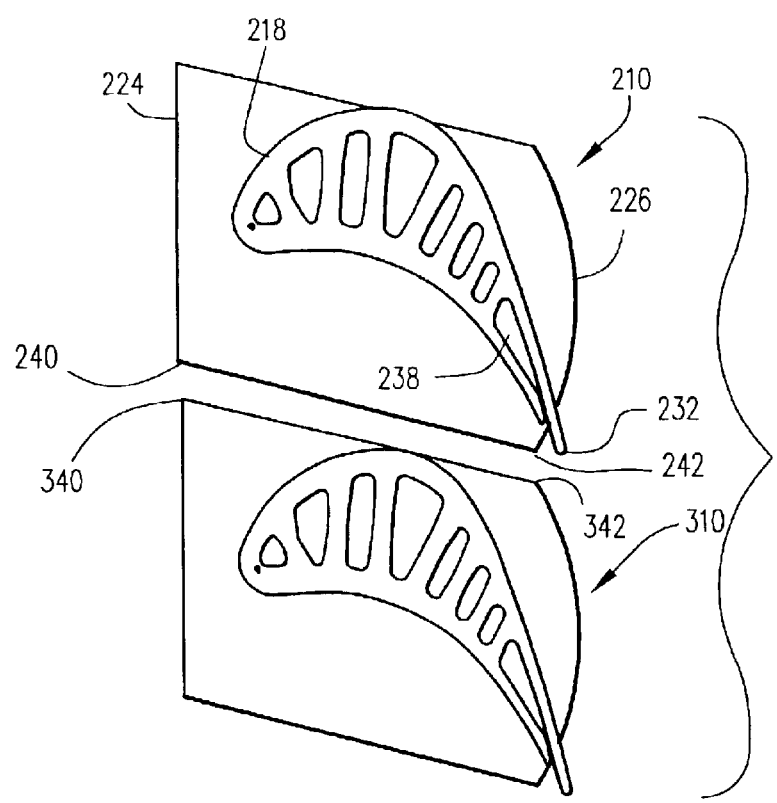
FIG. 6 is a view similar to FIG. 5 but sectioned through the airfoil portions of the buckets.

Turning now to FIG. 5, the bucket 210, otherwise similar to buckets 10 and 110, is formed with forward and aft shank walls 224, 226. In accordance with this invention, the aft shank wall 226 is convexly curved from side to side, i.e., such that the convex surface projects axially relative to the turbine rotor centerline indicated at 46. This effectively thickens the ligament 248 between the closest cooling cavity 238 and the aft shank wall 226. In addition, as made apparent in FIG. 6, the trailing edge 232 is afforded considerably more overhang vis-a-vis the aft shank wall 226 than in the prior design (see FIG. 4). At the same time, the corner edges 240, 242 of the bucket 210 may still correctly align with facing corner edges 340, 342 of adjacent bucket 310.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine bucket comprising an airfoil portion and a shank portion with a substantially horizontal platform radially therebetween, said shank portion having a forward shank wall and an aft shank wall; at least said aft shank wall convexly curved from one side of the bucket to an opposite side of the bucket.

2. The turbine bucket of claim 1 wherein said shank portion is formed with one or more angel wings projecting from said aft shank wall, and wherein said aft shank wall is convexly curved in an area below said platform but above an uppermost of said one or more angel wings.

3. The turbine bucket of claim 1 wherein said bucket is formed with internal cooling cavities.

4. The turbine bucket of claim 1 wherein said airfoil portion includes a leading edge and a trailing edge and said aft shank wall lies adjacent said trailing edge.

5. The turbine bucket of claim 3 wherein said internal cooling cavities include a plurality of cavities in said shank portion and said airfoil portion and wherein one of said cavities lies adjacent said aft shank wall.

6. The turbine bucket of claim 1 wherein said airfoil portion includes a leading edge and a trailing edge, and wherein said trailing edge overhangs said aft shank wall.

7. The turbine bucket of claim 2 wherein opposite sides of said bucket are substantially straight.

8. The turbine bucket of claim 3 wherein said airfoil portion includes a leading edge and a trailing edge, and wherein said trailing edge overhangs said aft shank wall.

9. The turbine bucket of claim 2 wherein said shank portion also includes a pair of substantially straight side walls.

10. A turbine bucket comprising an airfoil portion and a shank portion with a substantially horizontal platform radially therebetween, said shank portion having a forward shank wall and an aft shank wall; said aft shank wall convexly curved from one side of the bucket to an opposite side of the bucket; wherein said internal cooling circuit includes a plurality of cavities in said shank portion and said airfoil portion and wherein one of said cavities lies adjacent said aft shank wall; and further wherein said airfoil portion includes a leading edge and a trailing edge, said trailing edge overhanging said aft shank wall.

11. The turbine bucket of claim 10 wherein said shank portion is formed with one or more angel wings projecting from said aft shank wall, and wherein said aft shank wall is convexly curved in an area below said platform but above an uppermost of said one or more angel wings.

12. The turbine bucket of claim 11 wherein said airfoil portion includes a leading edge and a trailing edge, and wherein said trailing edge overhangs said aft shank wall.

* * * * *